(12) United States Patent
Hioki et al.

(10) Patent No.: US 9,052,471 B2
(45) Date of Patent: Jun. 9, 2015

(54) OPTICAL CONNECTOR PLUG

(71) Applicant: SANWA DENKI KOGYO CO., LTD., Tokyo (JP)

(72) Inventors: Yasusuke Hioki, Tokyo (JP); Norio Iguchi, Tokyo (JP)

(73) Assignee: SANWA DENKI KOGYO CO., LTD., Tokyo (JP)

( * ) Notice: Subject to any disclaimer, the term of this patent is extended or adjusted under 35 U.S.C. 154(b) by 0 days.

(21) Appl. No.: 13/894,651

(22) Filed: May 15, 2013

(65) Prior Publication Data

US 2014/0126874 A1    May 8, 2014

(30) Foreign Application Priority Data

Nov. 8, 2012   (JP) ................................. 2012-245950

(51) Int. Cl.
*G02B 6/38* (2006.01)

(52) U.S. Cl.
CPC ............ *G02B 6/3893* (2013.01); *G02B 6/3825* (2013.01); *G02B 6/3849* (2013.01)

(58) Field of Classification Search
None
See application file for complete search history.

(56) References Cited

U.S. PATENT DOCUMENTS

| 5,845,036 | A | 12/1998 | De Marchi |
| 2006/0153503 | A1 | 7/2006 | Suzuku et al. |
| 2008/0107381 | A1* | 5/2008 | Nishioka et al. ................. 385/60 |
| 2011/0206325 | A1* | 8/2011 | Hioki et al. ....................... 385/76 |
| 2011/0229088 | A1* | 9/2011 | Isenhour et al. ................. 385/78 |

FOREIGN PATENT DOCUMENTS

| EP | 1 072 918 A2 | 1/2001 |
| JP | 2011170264 A | 9/2011 |

OTHER PUBLICATIONS

Search Report dated Nov. 11, 2013 issued in corresponding European application No. 13173756.1.

* cited by examiner

*Primary Examiner* — Jerry Rahll
(74) *Attorney, Agent, or Firm* — Bacon & Thomas, PLLC

(57) ABSTRACT

An inserting and extracting motion of an optical plug can be easily carried out via a knob, even in a narrow space. An optical connector plug is provided with a stopper guide in a rear portion of an upper surface of a knob to which an optical plug is installed, a spring guide, an outer cover which is provided in an outer surface of the knob, and a spring which is arranged in between the stopper guide and the outer cover. In the optical connector plug, the outer cover is pressed by an optical connector adapter so as to move backward while compressing the spring, whereby a shutter is opened and the optical plug is allowed to protrude forward from the outer cover. The optical connector plug is provided with a grip portion which protrudes up and down and right and left from a rear end portion of the knob.

3 Claims, 11 Drawing Sheets

FIG. 9A – Prior Art
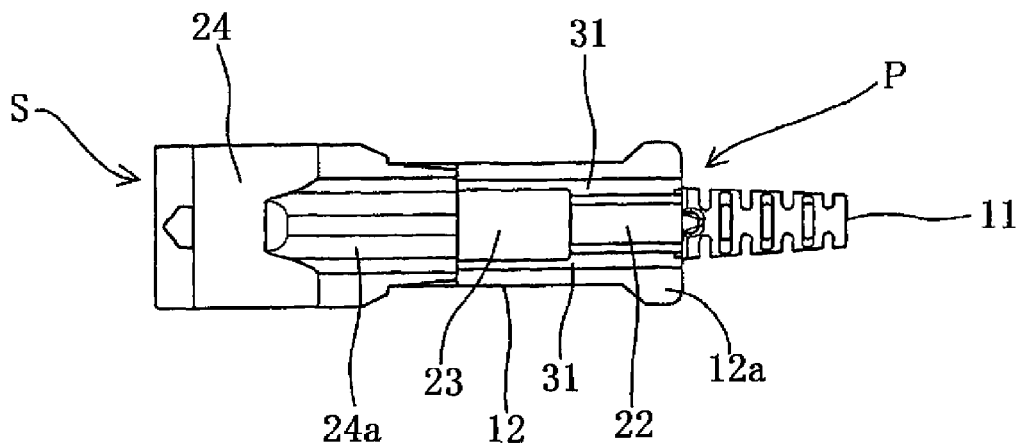
FIG. 9B – Prior Art
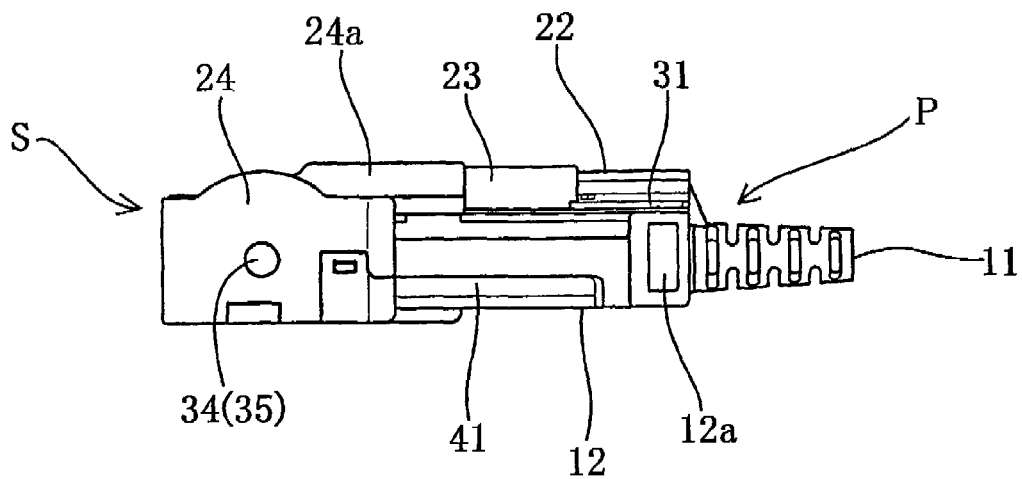
FIG. 9C – Prior Art
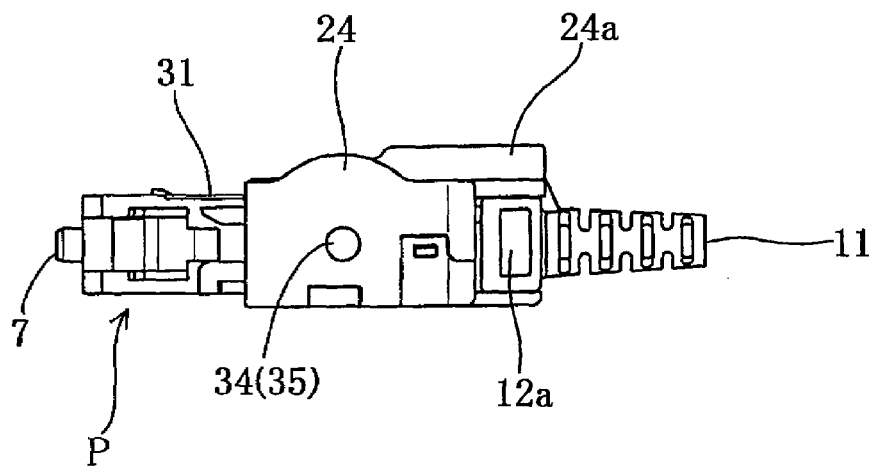

OPTICAL CONNECTOR PLUG

BACKGROUND OF THE INVENTION

1. Field of the Invention

The present invention relates to an improvement of a knob part of an optical connector plug which is structured such as to be shut off by a shutter at a time when the optical connector plug is not fitted to an optical connector adapter and be automatically opened the shutter at a time when the optical connector plug is fitted to the optical connector adapter.

2. Description of the Conventional Art

Conventionally, in this kind of optical connector plug which is provided with the automatically opened and closed shutter, for example, as disclosed in Japanese Unexamined Patent Publication No. 2011-170264 which was previously filed by the applicant of the subject application, a rack and pinion type shutter automatically opening and closing mechanism S is attached to an outer periphery of a front portion of a knob 12 of an optical plug P, the shutter automatically opening and closing mechanism S being structured such as to be normally shut off by an approximately enclosed type shutter at a time when the shutter automatically opening and closing mechanism S is not fitted to an optical connector adapter Q, and be automatically opened the shutter at a time when the shutter automatically opening and closing mechanism S is fitted to the optical connector adapter Q (refer to FIGS. 8, 9, 10 and 11).

The shutter automatically opening and closing mechanism S is installed to the optical plug P in such a manner as to cover an upper side of the sleeve-like knob 12 along a longitudinal direction by attaching a rear stopper guide 22 and an intermediate spring guide 23 to an outer cover 24 which covers a front side of the sleeve-like knob 12 along the longitudinal direction in a polygonal shape so as to freely expand and contract with each other, as shown in FIGS. 8A, 8B, 9A, 9B and 9C. In this case, a grip portion 12a of the knob 12 for gripping the optical plug P protrudes like a rectangular projection shape right and left in a rear end side.

The stopper guide 22 is integrally formed in an upper surface of the grip portion 12a in the rear end of the knob 12, and the spring guide 23 is structured such as to be slidably movable to the upper surface of the stopper guide 22. On the other hand, the outer cover 24 is formed as an approximately rectangular tube shape which is approximately the same shape as an outer periphery of a housing H of the optical connector adapter Q, and is structured such that an extension portion 24a protruding toward a rear side from an upper side thereof can slidably move on the upper surface of the spring guide 23, as shown in FIGS. 10A, 10B, 11A and 11B.

Further, a front side of the knob 12 to which the optical plug P is installed is inserted to an inner portion of the tube of the outer cover 24, and guide projections (not shown) which are provided in a protruding manner in both right and left sides of an upper inner surface of the outer cover 24 are engaged with guide long grooves 31 which are formed along a longitudinal direction in both right and left sides of the upper surface of the knob 12. Accordingly, when the plug P (the knob 12) moves forward in relation to the outer cover 24, the outer cover 24 relatively slides toward the stopper guide 22 side (the rear side of the knob 12) along the guide long grooves 31.

Further, a rack arm (not shown) is arranged in each of inner surfaces in a lower side of right and left side walls of the outer cover 24, and a pinion (not shown) serving as rotary shaft portions of both right and left ends of the shutter is engaged with the rack arm. The rack arm can move back and forth in relation to the knob 12 by fitting to guide portions 41 which are provided in both right and left lower ends of the knob 12 so as to be concaved along a longitudinal direction. Further, on the basis of a back and forth movement of the rack arm, the shutter 21 is automatically opened and closed via the pinion.

As shown in FIGS. 11A and 11B, when the optical plug P is inserted to the housing H of the optical connector adapter Q, the outer cover 24 hits against an inlet of an insertion opening portion of the optical connector adapter Q, whereby the shutter starts opening at the same time that the outer cover 24 starts moving backward. Accordingly, the outer cover 24 moves backward to a position of the stopper guide 22 in a rear portion while compressing a spring 28 together with the spring guide 23. In other words, the optical plug P moves so as to protrude forward from the outer cover 24. In the moving end, a ferrule is inserted to a sleeve holder of the optical connector adapter Q.

SUMMARY OF THE INVENTION

Problem to be Solved by the Invention

However, in the conventional structure disclosed in the patent document 1, the knobs 12 for gripping the optical plug P are only provided in the right and left sides of the rear end side as mentioned above, and the optical plug P can not be gripped from up and down sides. Accordingly, as shown in FIGS. 10A and 11B, in the case that any obstacle, for example, wall portions W exist in the right and left sides of the optical connector adapter Q, a clearance between the knob 12 and the wall portion W is narrow and a finger can not reach the optical connector adapter Q, whereby an inserting and extracting motion becomes very hard.

Accordingly, the present invention is made by taking into consideration the conventionally existing circumstances as mentioned above, and an object of the present invention is to provide an optical connector plug which is structured such that an inserting and extracting motion of an optical plug can be easily carried out via a knob by utilizing upper and lower spaces, even in the case that a narrow space exists by right and left wall portions of an optical connector adapter.

Means for Solving the Problem

In order to achieve the object mentioned above, according to the present invention, there is provided an optical connector plug comprising:

a stopper guide which is integrally provided in a rear portion of an upper surface of a knob to which an optical plug is installed;

a spring guide which is slidably fitted to an outer surface of the stopper guide;

an approximately rectangular tube shaped outer cover which is slidably fitted to each of the knob and outer surfaces of the spring guide and the stopper guide;

a spring which is arranged in an energizing manner between the stopper guide and the outer cover; and the outer cover being pressed by an optical connector adapter so as to move backward to a rear portion of the stopper guide while compressing the spring, whereby a shutter is opened and the optical plug is allowed to protrude forward from the outer cover, wherein the optical connector plug is provided with a grip portion which protrudes up and down and right and left from a rear end portion of the knob.

The grip portion is formed as an approximately rectangular tube shape as a whole by upper and lower side surfaces which are formed as rectangular surfaces, and right and left side surfaces which are formed as approximately L-shaped surfaces.

Effect of the Invention

According to the present invention, even in the case that the narrow space caused by the wall portion exists in the right and left sides of the optical connector adapter, it is possible to easily and rapidly carry out an inserting and extracting motion of the optical plug via the knob, by utilizing a space in the upper and lower sides.

In other words, since the grip portion protruding up and down and right and left from the rear end portion of the knob is provided, the inserting and extracting motion of the optical plug can be easily and securely carried out by gripping the upper and lower surfaces of the grip portion by a finger, even in the case that the wall portions exist in the right and left sides of the optical connector adapter, as long as any space exists in the upper and lower sides of the optical connector adapter.

Further, since the grip portion is formed as the approximately rectangular tube shape as a whole by the upper and lower sides surfaces which are formed as the rectangular surfaces, and the right and left side surfaces which are formed as the approximately L-shaped surfaces, it is possible to freely grip any of the upper and lower side surfaces and the right and left side surfaces of the grip portion, and a usability is improved. Further, it is possible to sufficiently secure a gripping operability at a time of inserting and extracting the optical plug to and from the optical connector adapter.

BRIEF EXPLANATION OF THE DRAWINGS

FIGS. 1A and 1B show an example of an outer appearance shape of an optical connector plug according to an embodiment for executing the present invention, in which FIG. 1A is a perspective view of a state that a knob is installed to an outer cover, and FIG. 1B is a perspective view of a knob part;

FIGS. 2A, 2B and 2C show the example of the outer appearance shape of the optical connector plug, in which FIG. 2A is a plan view, FIG. 2B is a side elevational view, and FIG. 2C is a side elevational view of a state that the outer cover is moved backward;

FIGS. 3A and 3B show a structure example of the optical connector plug, in which FIG. 3A is a partly cut side elevational view showing only the outer cover by a cross section, and FIG. 3B is a vertical cross sectional view;

FIGS. 4A, 4B and 4C show the structure example of the optical connector plug, in which FIG. 4A is a front elevational view, FIG. 4B is a front elevational view of a state that a shutter is opened, and FIG. 4C is a back elevational view;

FIGS. 5A, 5B and 5C show an example of a connection of the optical connector plug to an optical connector adapter, in which FIG. 5A is a plan view of a state before the connection, FIG. 5B is a side elevational view of a state after the connection, FIG. 5C is a partly cut plan view of the state after the connection;

FIGS. 6A and 6B describe a motion for connecting the optical connector plug to the optical connector adapter arranged in a wall portion, in which FIG. 6A is a plan view of a state before the connection, and FIG. 6B is a side elevational view of the state before the connection;

FIGS. 7A and 7B describe the motion for connecting the optical connector plug to the optical connector adapter arranged in the wall portion, in which FIG. 7A is a side elevational view of a state after the connection, and FIG. 7B is a plan view of the state after the connection;

FIGS. 8A and 8B show an optical connector plug according to a prior art, in which FIG. 8A is a perspective view of a state that a knob is installed to an outer cover, and FIG. 8B is a perspective view of a knob part;

FIGS. 9A, 9B and 9C show the optical connector plug according to the prior art, in which FIG. 9A is a plan view, FIG. 9B is a side elevational view, and FIG. 9C is a side elevational view of a state that the outer cover is moved backward;

FIGS. 10A and 10B describe a motion for connecting the optical connector plug to an optical connector adapter arranged in a wall portion according to the prior art, in which FIG. 10A is a plan view of a state before the connection, and FIG. 10B is a side elevational view of the state before the connection; and FIGS. 11A and 11B describe the motion for connecting the optical connector plug to the optical connector adapter arranged in the wall portion according to the prior art, in which FIG. 11A is a side elevational view of a state after the connection, and FIG. 11B is a plan view of the state after the connection.

DETAILED DESCRIPTION OF PREFERRED EMBODIMENT

A description will be in detail given below of an embodiment of the present invention with reference to the accompanying drawings.

Figure 3A:
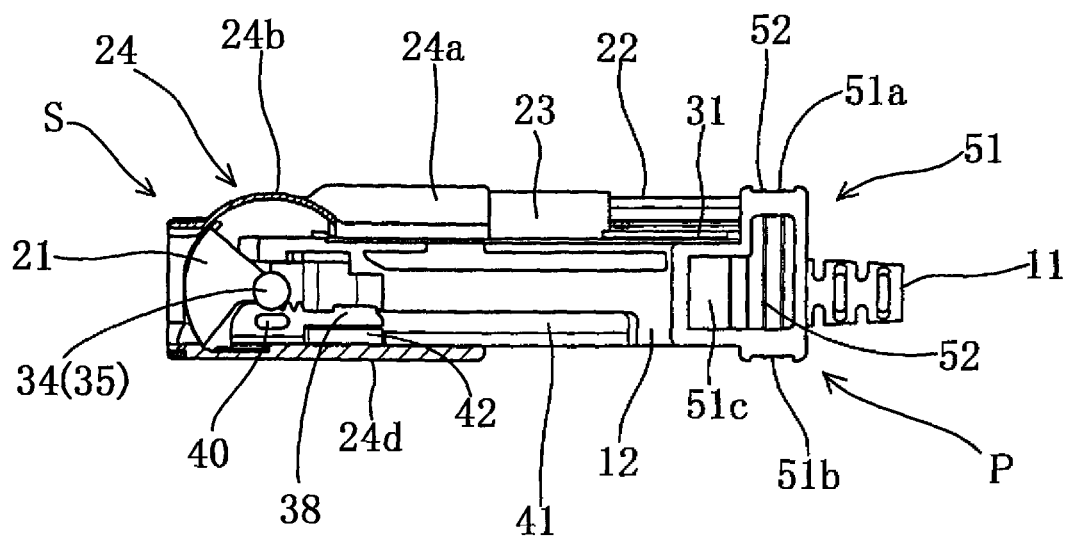
Figure 3B:
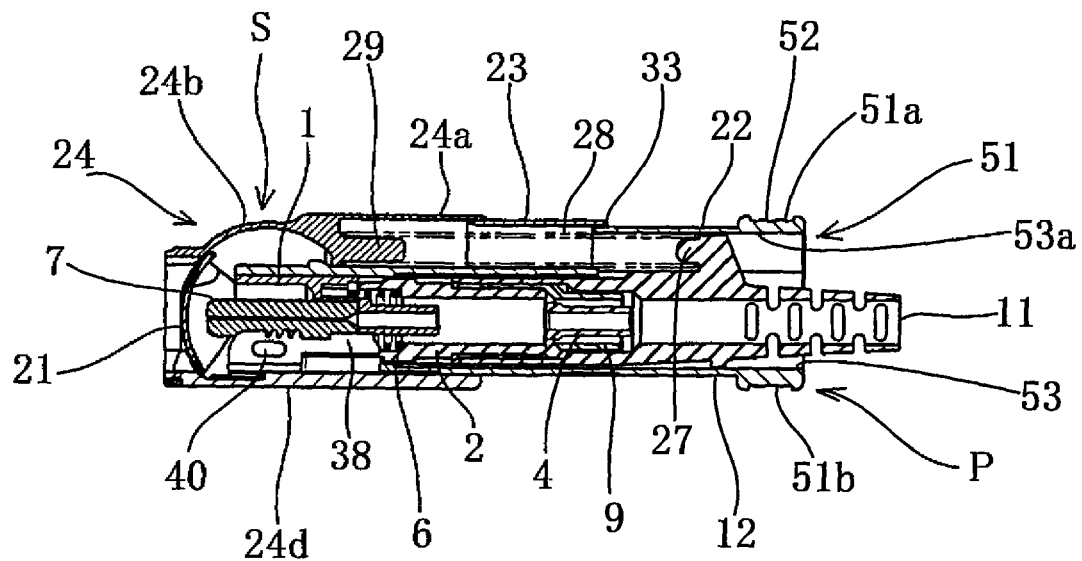

In the present invention, reference symbol P shown in the drawings denotes an optical plug, and the optical plug P is constructed by a tubular plug frame 1, a cylindrical stop ring 2 which is fitted and fixed its front portion within a rear portion of the plug frame 1, a caulking ring 4 which fixes by caulking a Kevlar® fiber in relation to a rear outer peripheral surface of the stop ring 2, an optical fiber (not shown) which is inserted into the stop ring 2 and the caulking ring 4, a ferrule 7 which fixes the optical fiber in its axis in a penetrating manner, and is arranged in an axis of the plug frame 1 while interposing a compression spring 6 in relation to the stop ring 2, a ring 9 which fixes a cord exterior covering (not shown) in relation to a rear outer peripheral surface of the caulking ring 4, a boot 11 which covers the caulking ring 4, an eyelet 9 and an optical fiber cord (not shown), and a knob 12 which covers each of the plug frame 1 and the stop ring 2, as shown in FIG. 3B.

As shown in FIGS. 3A, 3B, 4A, 4B and 4C, a shutter automatically opening and closing mechanism S is attached to an outer periphery of the knob 12 in the optical plug P. The shutter automatically opening and closing mechanism S is structured such as to be normally shut off by an approximately enclosed type shutter 21 at a time when the shutter automatically opening and closing mechanism S is not fitted to a housing H of an optical connector adapter Q, and is automatically opened the shutter 21 at a time when the shutter automatically opening and closing mechanism S is fitted to the housing H of the optical connector adapter Q, and is constructed by a rack and pinion system.

An opening and closing element of the shutter automatically opening and closing mechanism S is provided with a rack arm 38 which is arranged so as to be slidable back and forth in relation to an outer cover 24 in both right and left inner sides of the outer cover 24 and is movable backward in synchronous with the outer cover 24 in a slide end, and the pinion 34 which is coaxially integral with an opening and closing shaft portion 35 of the shutter 21 and is mentioned already, as shown in FIGS. 3A and 3B, and the pinion 34 is engaged with a teeth portion of the rack arm 38.

In other words, the shutter automatically opening and closing mechanism S is structured, as shown in FIGS. 3A and 3B, such that the rack arm 38 is horizontally arranged in each of inner surfaces in a lower side of right and left side walls of the outer cover 24, and the pinion 34 coming to a rotary axis portion of both right and left ends of the shutter 21 is engaged with a teeth portion which is provided in front of an upper portion of the rack arm 38. Further, since the rack arm 38 is fitted to a guide portion 41 which is provided in a concave manner along a longitudinal direction in both right and left lower ends of the knob 12, the rack arm 38 can move back and forth in relation to the knob 12. Further, on the basis of backward and forward movement of the rack arm 38, the shutter 21 is automatically opened and closed via the pinion 38 which is engaged with the teeth portion.

Further specifically, the shutter 21 which is formed as an approximately circular arc mask shape (approximately quarter spherical shell) in its cross section is provided in an inner side of a front opening portion of the outer cover 24 so as to be freely opened and closed (so that the shutter 21 surface can oscillate between a forward looking position and an upward looking position) by an opening and closing axis portion. In other words, as shown in FIG. 3A, both right and left ends of the shutter 21 are provided with an opening and closing axis portion 35 which is coaxially integral with the pinion 34 (or is formed as a pinion shape in its both ends), and the opening and closing axis portion 35 is rotatably pivoted to a bearing (not shown) which is provided in the inner surfaces of the right and left side walls of the outer cover 24. Further, an upper surface of an opening portion of the outer cover 24 is formed as an upward circular arc type hood shape so that a retracting space can be obtained at a time when the shutter 21 is oscillated to an upward looking position.

Accordingly, the outer cover 24 is formed as an approximately rectangular tube shape which is approximately the same shape as an outer periphery of the housing H of the optical connector adapter Q, as shown in FIGS. 5A, 5B, 5C, 6A, 6B, 7A and 7B. In other words, the outer cover 24 is provided with a circular arc type hood shaped upper surface portion 24b, right and left side surface portions 24c and a bottom cover 24d, and an extension portion 24a protruding toward a rear side of the upper surface portion 24b can slidably move on an upper surface of the spring guide 23.

Further, as shown in FIG. 3B, a projection 29 is formed in an inner side of the extension portion 24a of the outer cover 24 backward, and the other end of the spring 28 is hooked and retained to the projection 29.

Figure 1A:
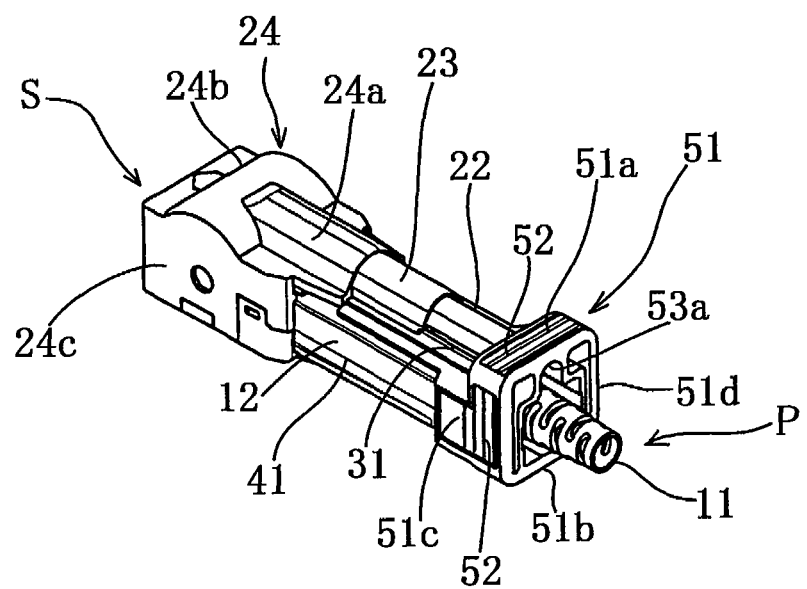
Figure 1B:
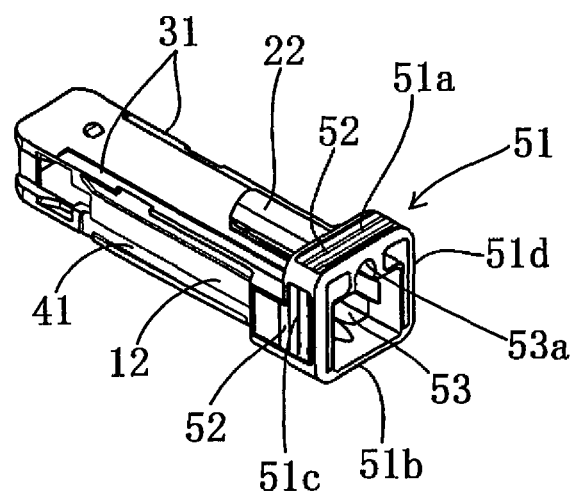
Figure 2A:
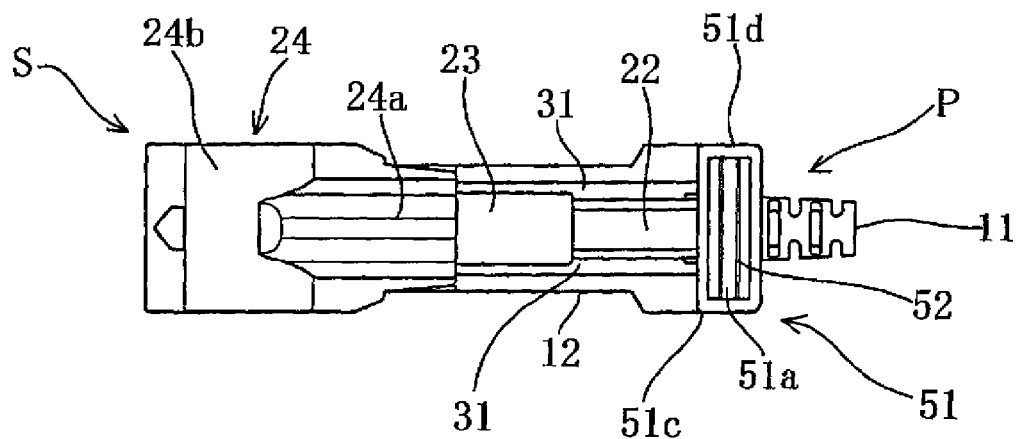
Figure 2B:
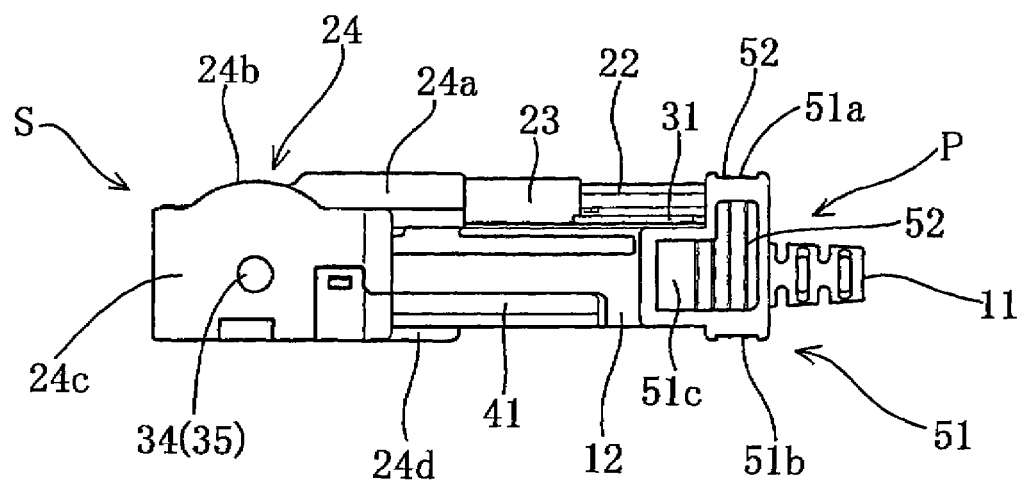
Figure 2C:
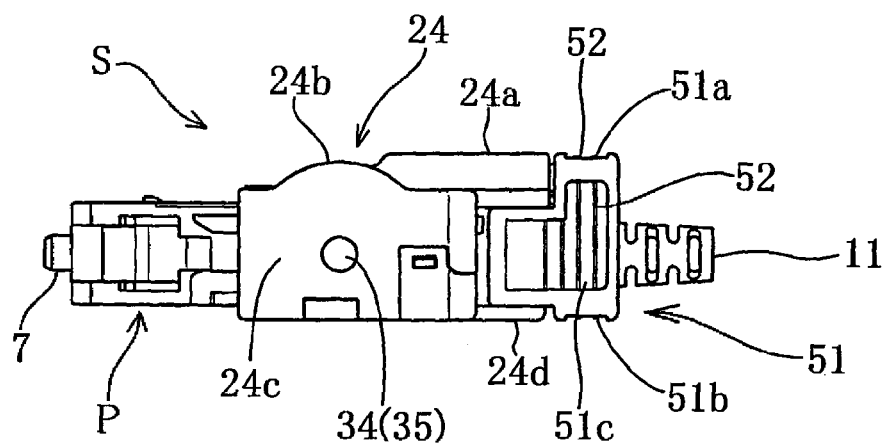
Figure 4A:
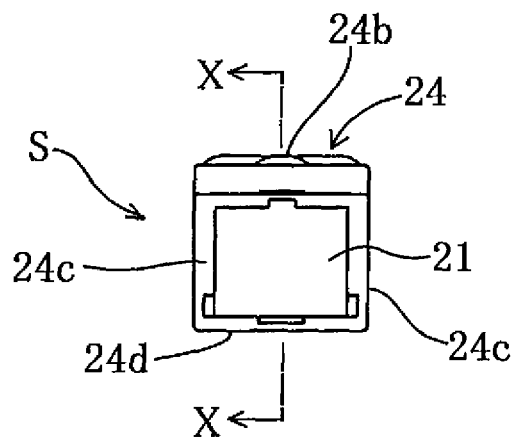
Figure 4B:
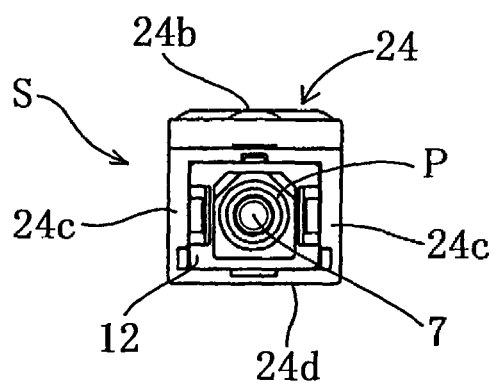
Figure 4C:
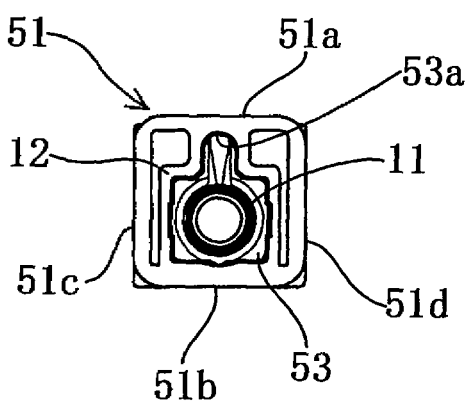
Figure 5A:
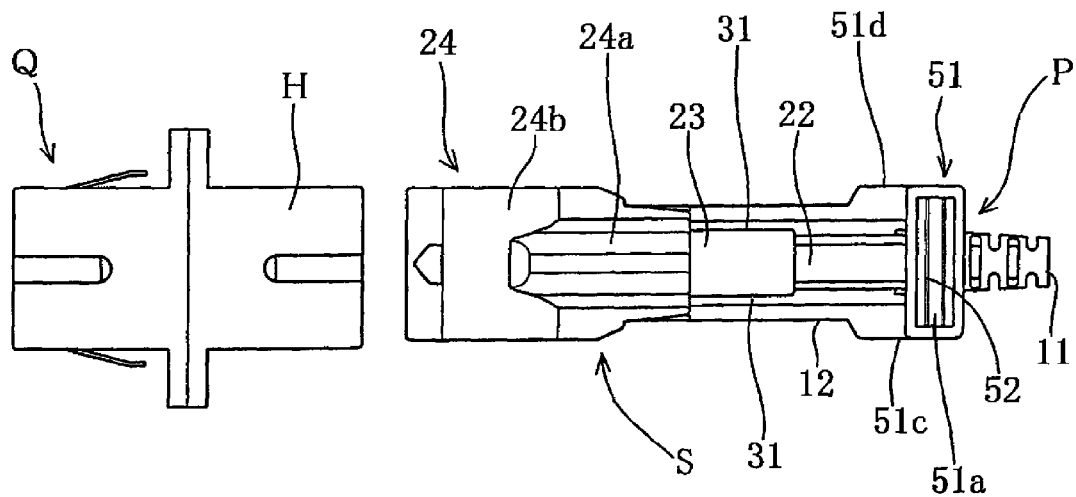
Figure 5B:
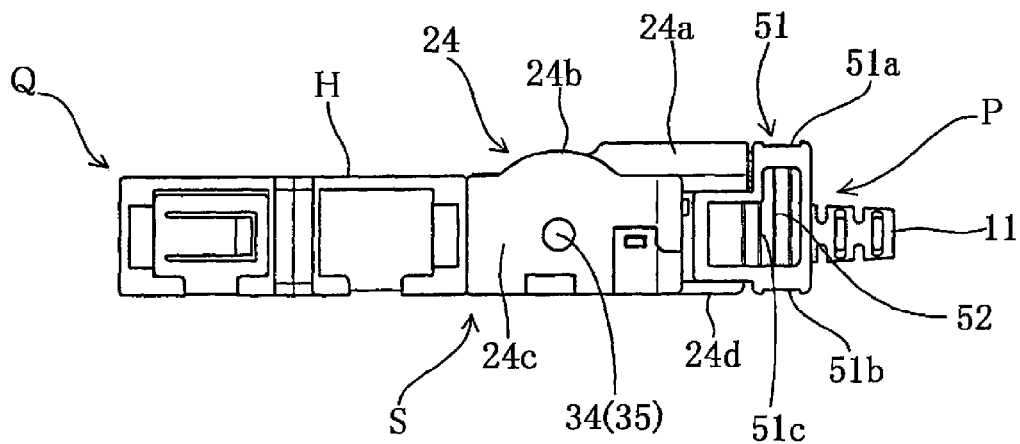
Figure 5C:
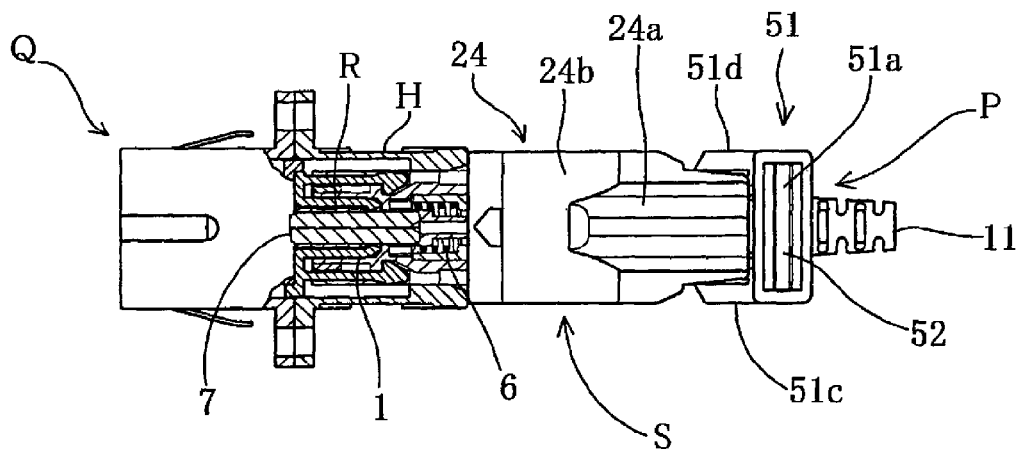
Figure 6A:
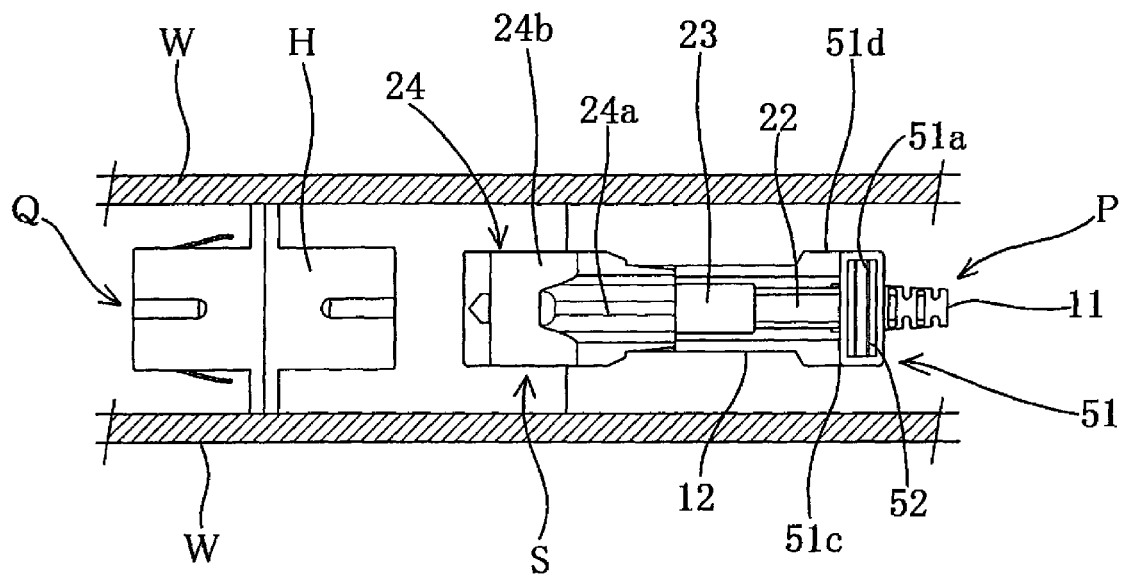
Figure 6B:
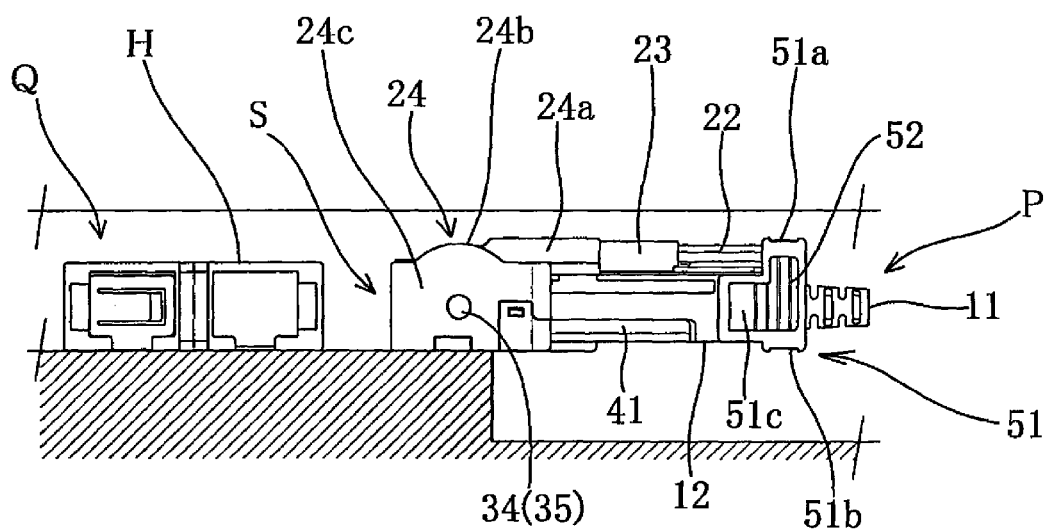
Figure 7A:
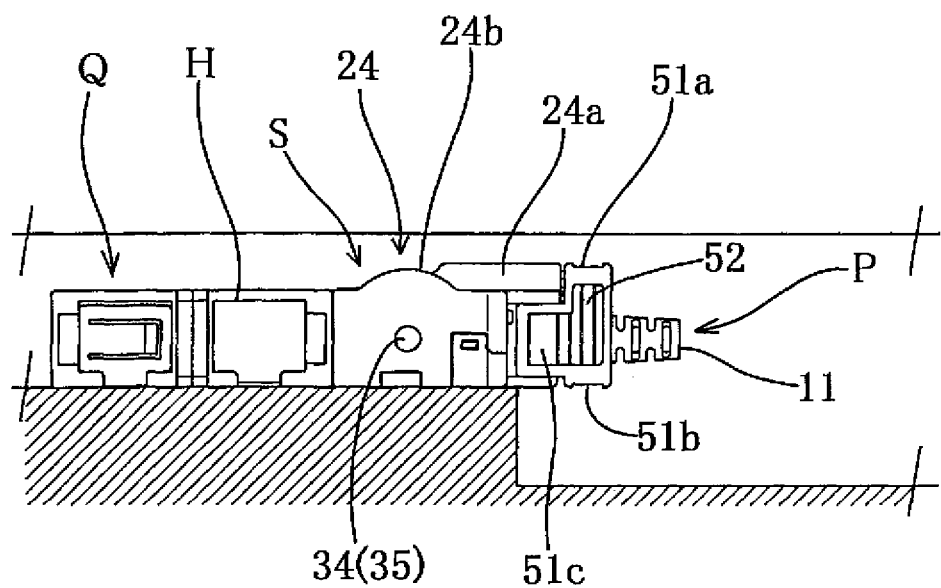
Figure 7B:
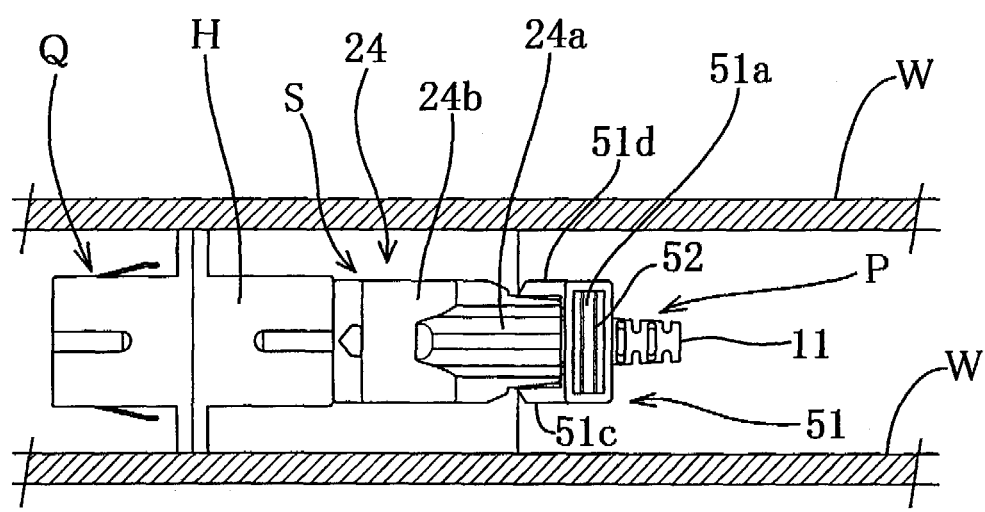
Figure 8A:
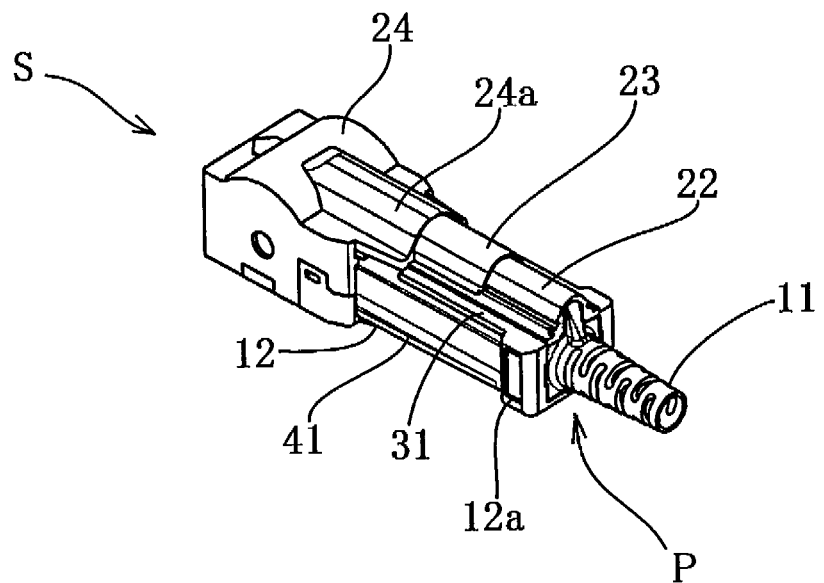
Figure 8B:
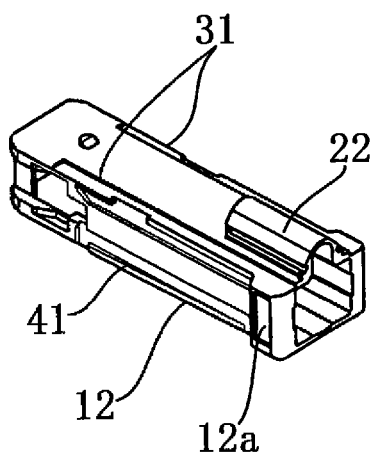
Figure 10A:
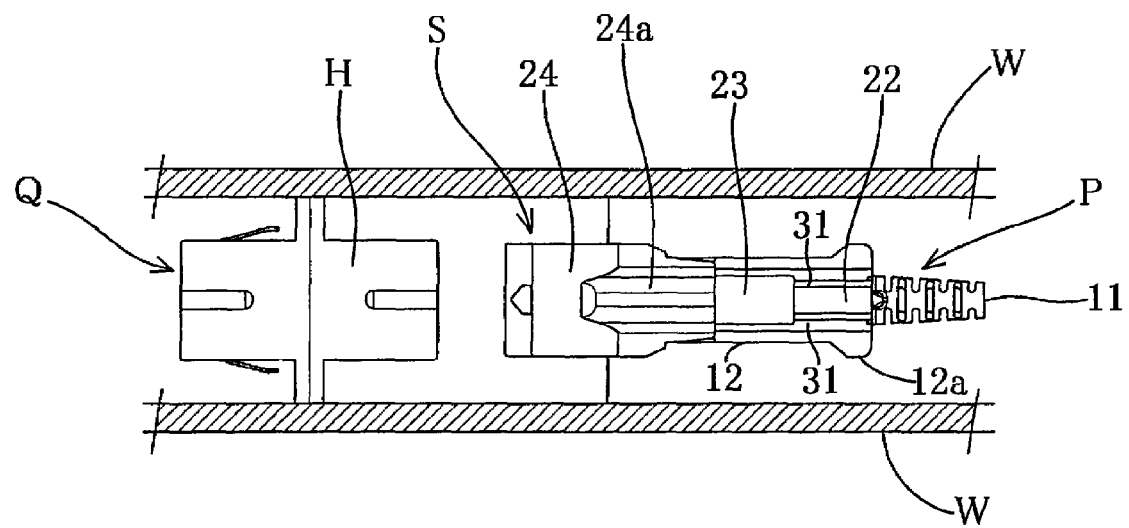
Figure 10B:
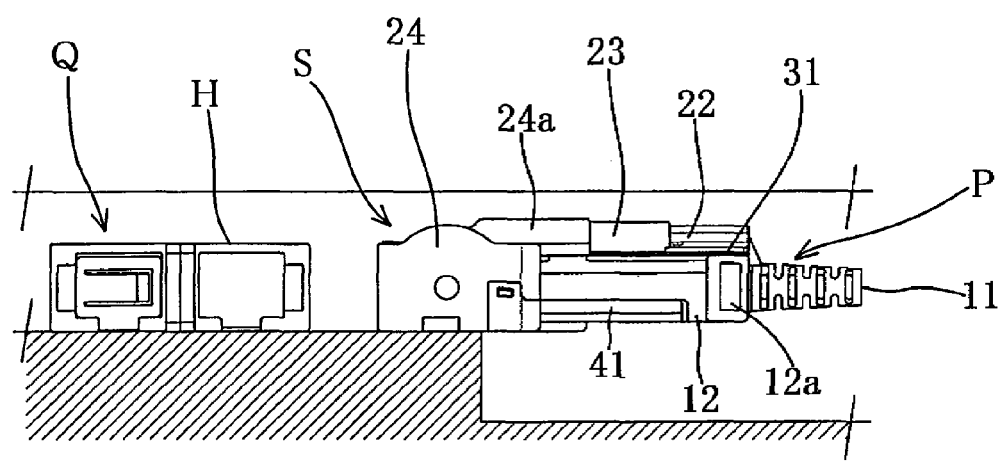
Figure 11A:
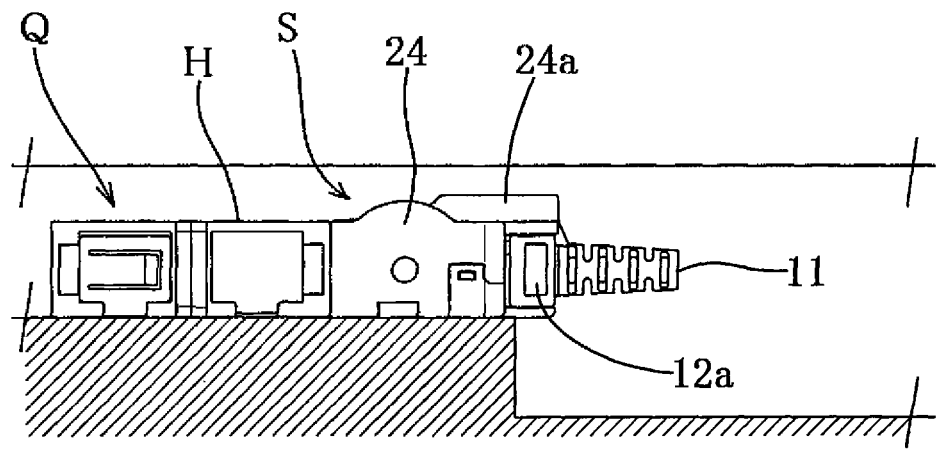
Figure 11B:
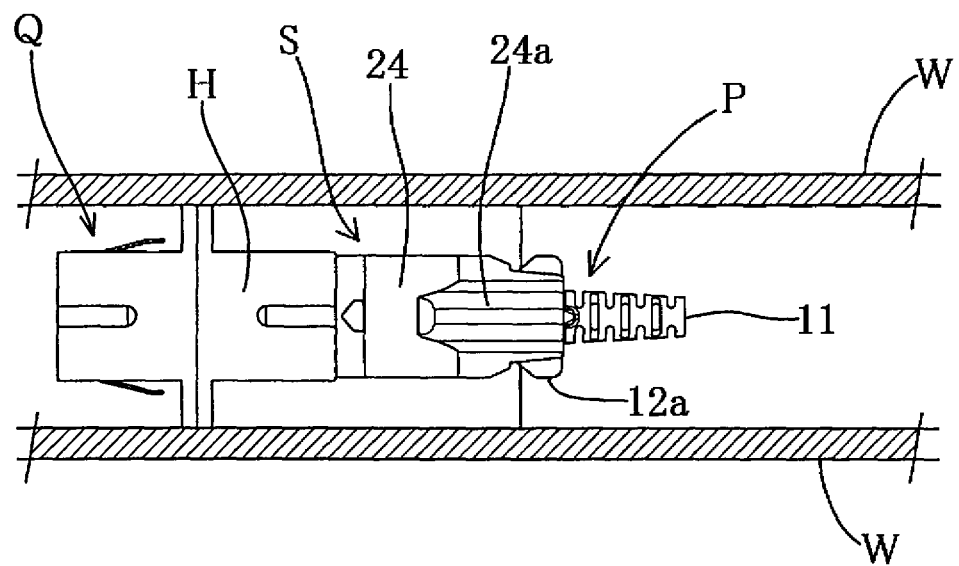

On the other hand, as shown in FIGS. 1A, 2A, 2B, 2C, 3A and 3B, a grip portion 51 is integrally formed in a rear end of the knob 12. Further, as shown in FIGS. 1A, 1B and 4C, an approximately rectangular opening portion 53 for inserting the boot 11 is formed in an inner side of the grip portion 51, and a concave portion 53a which is recessed as an approximately reverse U-shaped form is formed in an upper side of the opening portion 53.

When the boot 11 is fitted and fixed to the opening portion 53, a projection 27 provided forward in an upper side of the boot 11 is fitted into the concave portion 53a, and is arranged forward in an inner side of the stopper guide 22, as shown in FIG. 3B. Further, one end of the spring 28 is hooked and retained to a projection 29 which is provided in an inner side of the extension portion 24a of the outer cover 24, and the other end side of the spring 28 is hooked and retained to the projection 27. In this connection, the spring guide 23 can slidably move on the upper surface of the stopper guide 22, and can pass an approximately middle portion of the spring 28 to an inner side thereof.

Accordingly, when the plug P (the knob 12) moves forward in relation to the outer cover 24, the outer cover 24 relatively slides toward the stopper guide 22 side (the rear portion side of the knob 12) which is integrally provided at the center above a front end of the grip portion 51 along a guide long grove 31 while the spring 28 being compressed.

According to the structure mentioned above, as shown in FIGS. 5B, 5C, 7A and 7B, when the optical plug P is inserted to the housing H of the optical connector adapter Q, the outer cover 24 hits against an inlet in an insertion opening portion of the optical connector adapter Q, and the outer cover 24 starts moving backward. Accordingly, since the outer cover 24 moves backward together with the spring guide 23 while compressing the spring 28, the optical plug P moves so as to protrude forward out of the outer cover 24, and the ferrule of the optical plug P is inserted to a sleeve holder R of the optical connector adapter Q at this moving end.

Further, as shown in FIGS. 1A, 1B, 2A, 2B, 2C, 3A, 3B, 4C and 5A, the grip portion 51 is formed to be wider vertically and horizontally in its back elevational view in such a manner as to protrude in four directions including up, down, right and left directions from a rear end portion of the knob 12 (the stopper guide 22). In other words, the grip portion 51 is formed as an approximately rectangular tube shape or a rectangular frame shape as a whole by four surfaces including an upper surface portion 51a and a lower surface portion 51b which are formed as an approximately rectangular surface shape form, and a right surface portion 51c and a left surface portion 51d which are formed as an approximately L-shaped surface form, a groove-like or protrusion-like slip stopper portion 52 is formed in each of the surfaces, and all the corner portions of the grip portion 51 are formed so as to be rounded.

As shown in FIGS. 2B, 2C, 3A, 3B, 5B and 7A, the right surface portion 51c and the left surface portion 51d of the grip portion 51 are both formed as the approximately L-shaped surface shape. Accordingly, when the outer cover 24 moves backward together with the spring guide 23 while compressing the spring 28, an L-shaped leading end side which has a narrow vertical width enters between a lower end edge of the extension portion 24a which protrudes toward the rear portion side from the upper side of the outer cover 24, and the bottom cover 24d of the outer cover 24.

Next, a description will be given of an example of a use and a motion of the embodiment which is constructed as mentioned above.

As shown in FIGS. 6A, 6B, 7A and 7B, in the case that the optical connector adapter Q is surrounded by right and left wall portions W, and a space exists up and down, for example, a step exists in a lower side in front of a floor surface where the optical adapter Q is arranged, the optical plug P may be inserted to the optical connector adapter Q by holding the upper surface portion 51a and the lower surface portion 51b of the grip portion 51 in the rear end portion of the knob 12 by a finger. At this time, the outer cover 24 hits against the inlet of the insertion opening portion of the optical connector adapter Q, and the outer cover 24 starts moving backward.

Further, as shown in FIGS. 3A, 3B, 7A and 7B, the guide projection 40 of the rack arm 38 moves forward along a guide hole (not shown) of the outer cover 24, and the shutter 21 starts opening via the pinion 34 and the rack arm 38. In other words, the rack arm 38 moves in synchronous with the outer cover 24.

Accordingly, the outer cover 24 moves backward together with the spring guide 23 to a position of the rearward stopper guide 22 while compressing the spring 28. In other words, the optical plug P moves so as to protrude forward out of the outer cover 24. At this moving end, the ferrule 7 of the optical plug P is inserted to the sleeve holder R of the optical connector adapter Q (refer to FIGS. 5C, 7A and 7B).

At this time, the vertically narrow L-shaped leading end portions of the right surface portion 51c and the left surface portion 51d of the grip portion 51 enter between the lower end edge of the extension portion 24a protruding toward the rear portion side from the upper side of the outer cover 24 and the bottom cover 24d of the outer cover 24. Accordingly, a stability on an inserting and extracting operation of the optical plug P can be secured.

In the case that the optical plug P is disconnected from the optical connector adapter Q, the optical plug P may be disconnected from the optical connector adapter Q while holding the upper surface portion 51a and the lower surface portion 51b of the grip portion 51 in the rear end portion of the knob 12 by the finger in the same manner as mentioned above.

In the case that the optical connector adapter Q is surrounded by the upper and lower wall portions W, and a space exists right and left, the optical plug P may be inserted to the optical connector adapter Q by holding the right surface portion 51c and the left surface portion 51d in the grip portion 51 in the rear end portion of the knob 12 by the finger.

As mentioned above, even in the case that a narrow space exists due to the right and left wall portions W of the optical connector adapter Q, the inserting and extracting motion of the optical plug P can be easily carried out via the grip portion 51 of the knob 12, by utilizing the up and down space.

What is claimed is:

1. An optical connector plug comprising:
    a stopper guide which is integrally provided in a rear portion of an upper surface of a knob to which an optical plug is installed;
    a spring guide which is slidably fitted to an outer surface of the stopper guide;
    an approximately rectangular tube shaped outer cover which is slidably fitted to each of said knob and outer surfaces of the spring guide and the stopper guide;
    a spring which is arranged in an energizing manner between the stopper guide and the outer cover; and
    said outer cover being pressed by an optical connector adapter so as to move backward to a rear portion of the stopper guide while compressing the spring, whereby a shutter is opened and the optical plug is allowed to protrude forward from the outer cover,
    wherein the optical connector plug is provided with a grip portion having an upper side surface and a lower side surface which protrude from a rear end portion of the knob, and a right side surface and a left side surface which protrude from the rear end portion of the knob,
    wherein the side surfaces of the grip portion define a rectangular tube shape, and
    wherein the upper and lower side surfaces are formed as rectangular surfaces, and the right and left side surfaces are formed as approximately L-shaped surfaces, wherein, when the outer cover moves backward, a leading end side of each L-shaped surface has a narrow vertical width that enters between a bottom cover of the outer cover and a lower end edge of an extension portion which protrudes from the outer cover.

2. The optical connector plug according to claim 1, further comprising a slip stopper portion having grooves or protrusions formed in each side surface of the grip portion.

3. The optical connector plug according to claim 1, wherein the rectangular tube shape of the grip portion further comprises rounded corner portions between each side surface of the grip portion.

* * * * *